C. L. EARLY.
SUN DIAL AND LOCOMETER.
APPLICATION FILED APR. 22, 1911.

1,146,412.

Patented July 13, 1915.
5 SHEETS—SHEET 1.

Fig.1

Witnesses
A. G. Hague
W. A. Loftus.

Inventor
Charles L. Early.
by J. Ralph Orwig atty's

C. L. EARLY.
SUN DIAL AND LOCOMETER.
APPLICATION FILED APR. 22, 1911.

1,146,412.

Patented July 13, 1915.
5 SHEETS—SHEET 3.

C. L. EARLY.
SUN DIAL AND LOCOMETER.
APPLICATION FILED APR. 22, 1911.

1,146,412.

Patented July 13, 1915.
5 SHEETS—SHEET 4.

Witnesses
A. G. Hague
W. D. Loftus

Inventor
Charles L. Early,
by J. Ralph Orwig atty

C. L. EARLY.
SUN DIAL AND LOCOMETER.
APPLICATION FILED APR. 22, 1911.

1,146,412.

Patented July 13, 1915.
5 SHEETS—SHEET 5.

Witnesses
A. G. Hague
W. A. Loftus

Inventor
Charles L. Early
by J. Ralph Orwig, atty

COLUMBIA PLANOGRAPH CO., WASHINGTON, D. C.

UNITED STATES PATENT OFFICE.

CHARLES L. EARLY, OF SAC CITY, IOWA.

SUN-DIAL AND LOCOMETER.

1,146,412.  Specification of Letters Patent.  Patented July 13, 1915.

Application filed April 22, 1911. Serial No. 622,685.

*To all whom it may concern:*

Be it known that I, CHARLES L. EARLY, a citizen of the United States, residing at Sac City, in the county of Sac and State of Iowa, have invented a certain new and useful Improved Sun-Dial and Locometer, of which the following is a specification.

The object of my invention is to provide a device of the class described of simple, durable and inexpensive construction, whereby an operator, by the aid of the instrument and a chronometer may accurately determine the latitude, longitude and correct sun time at any point upon the earth surface without the necessity of mathematical calculations of any kind.

A further object is to provide a device of this kind that may be permanently fixed in position and by which the operator may readily, quickly and easily determine both the sun time and the standard time of said locality with great accuracy and at the same time he may also determine the day of the year.

A further object is to provide a telescope attachment for the instrument by which the operator may obtain any of the foregoing results by observations based on any star whose true declination and right ascension is known to the operator.

My invention consists in certain details, in the construction, arrangement and combination of the various parts of the device whereby the objects contemplated are attained, as hereinafter more fully set forth, pointed out in my claims and illustrated in the accompanying drawings, in which:

In the accompanying drawings, I have shown both a portable instrument designed for ascertaining the latitude, longitude, the day of the year and the correct sun time, and another form of the invention designed to be permanently located on a suitable pedestal in a locality whose latitude and longitude is known and it is intended only for the purpose of determining the day of the year and the correct time both sun and standard of the locality in which the instrument is placed.

In the following description, I shall first set forth the construction and operation of the portable type of my invention.

The reference numeral 10 is used to indicate a stationary base for the sun dial. On this base I preferably provide two spirit levels 11 by which the base may be placed in an exactly horizontal position. Secured to the stationary base 10 is a dial plate 12 capable of pivotal movement in a vertical plane. Fixed to the dial plate is a quadrant 13 having thereon a scale hereinafter termed the dial angle scale marked in degrees from 1 to 90, or suitable sub-divisions thereof beginning at the bottom of the quadrant farthest from the dial. The scale is so arranged that when the dial is tilted at an angle of say, for instance, sixty degrees from a vertical line, the mark 60 on the dial angle scale will be exactly adjacent to a suitable stationary indicator 14 on the frame 10. In this connection, I have provided means for accurately adjusting the quadrant relative to the stationary indicator 14 and for holding it in any position of its adjustment as follows: The numeral 15, shown in Fig. 9, indicates an arm pivoted in line with the pivotal point of the dial. Said arm is provided with a forked end 16. Within this forked end is a pivoted block 17 having trunnions 18 at its sides extended through slots 19 in the forked sides 16.

Mounted in the stationary frame 10 is an adjusting screw 20 seated in the block 17. Fixed to the arm 15 is a clamping member 21 extended over the quadrant 13. A bolt 22 is fixed to the arm 15 and extends through the clamping member 21 and is provided with a winged nut 23 by which the clamping member 21 may be forced against the arm 15 to fix the arm in position relative to the quadrant. In practice with this part of the device and assuming that the winged nut 23 is loose upon its bolt then the operator may tilt the dial plate to position where the indicator 14 is close to the desired scale mark upon the dial angle scale; then the winged nut 23 may be tightened and further adjustment of the quadrant relative to the indicator 14 may be made by a manipulation of the screw 20 until the dial is moved to the exact position relative to the indicator 14 in which it is desired to place the quadrant.

The means by which the operator first ascertains the position in which the quadrant should be placed will be hereinafter described. Upon the face of the dial 12 near its periphery is a scale 24 indicating hour periods and fractional parts thereof, said scale being divided into twenty-four principal divisions indicating hours, said divisions being preferably numbered into two series of twelve hours each. On the outer portion of the scale the numbers indicating hours are arranged consecutively in a clock-wise direction and on the interior of the scale is a second series of numbers representing two twelve hour periods arranged consecutively counter-clockwise. The outer row of figures is used when making observations with the instrument at points north of the equator and the inner row of figures when making observations at points south of the equator as will be hereinafter explained.

Figure 3:
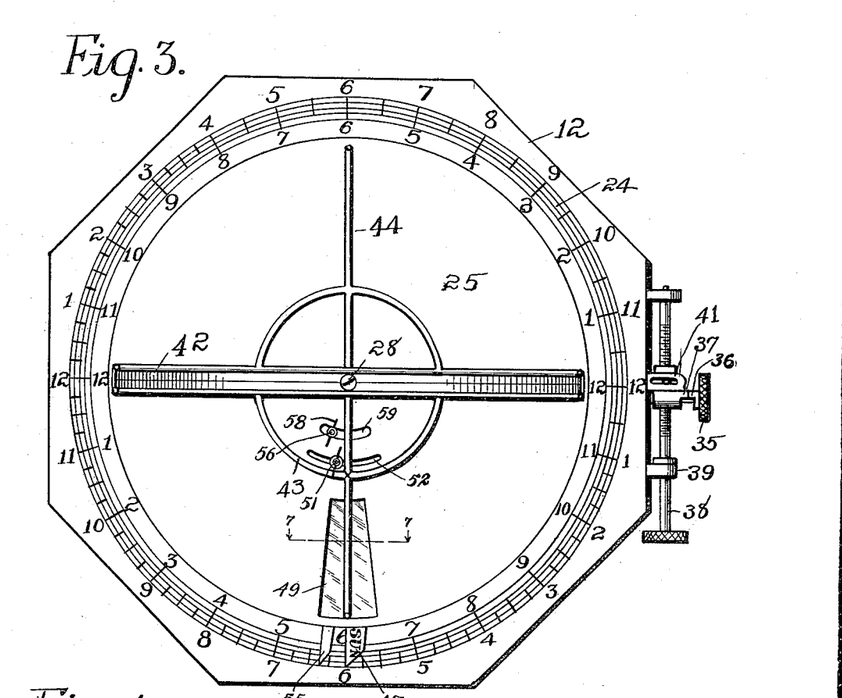
Fig. 3 shows a plan view of an instrument embodying my invention, the telescope attachment being removed.
Figure 4:
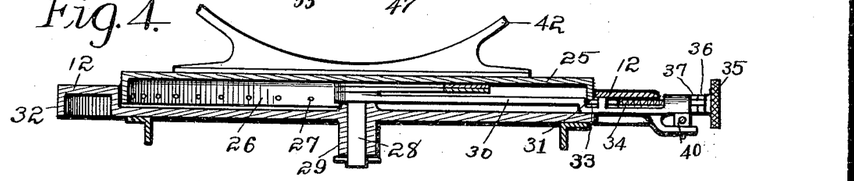
Fig. 4 shows a detail, transverse, sectional view through the stationary dial and the rotatable base for illustrating the means for adjusting the rotatable base relative to the stationary dial.
Figures 5, 7, 9:
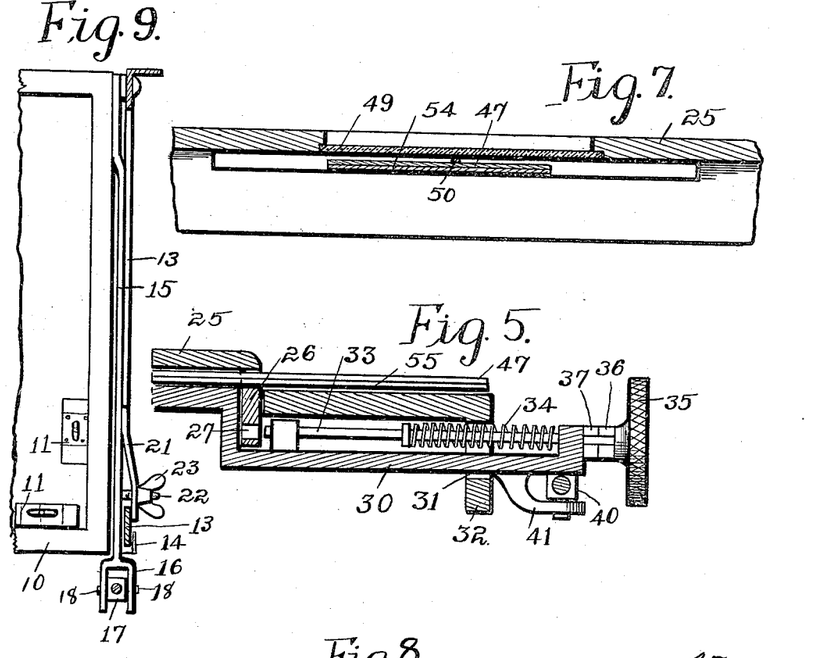
Fig. 5 shows an enlarged, detail, sectional view illustrating the means for adjusting the rotatable base relative to the stationary dial.
Fig. 7 shows a detail, sectional view on the line 7—7 of Fig. 3.
Fig. 9 shows a plan view of a portion of the stationary dial base and the means for adjusting the dial relative thereto.
Figure 6:
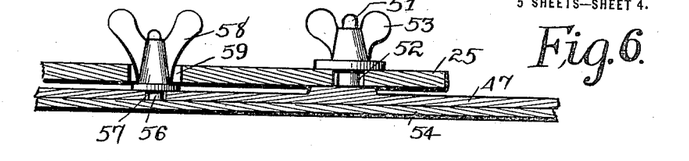
Fig. 6 shows an enlarged, detail, sectional view illustrating a portion of the sun time indicator and a portion of the standard time indicator and the means for adjusting them relative to each other and to the rotary base.

Mounted upon the dial is a rotatable base 25 having a downwardly extended flange 26 provided with perforations 27. This rotary base is mounted upon a central axle 28 which is inserted in a journal 29 in the dial plate. It is intended that this rotary base may be freely moved on its axis by the hand of the operator and it is also desirable that it may be accurately adjusted to any desired position. For accomplishing these results, I have provided on the axle 28 a pivoted arm 30 which extends through a slot 31 in the flange 32 of the dial. This arm is provided on its outer end with a slide bolt 33 designed to enter any one of the openings 27. Said slide bolt is yieldingly held by a spring 34 to position against the flange 26 so that it will enter any one of the holes 27 which may be in line with it. The slide bolt 33 is rotatable and has fixed to its outer end a small hand wheel 35. Said hand wheel is provided with a lug 36 designed to coact with a lug 37, as shown in Figs. 3 and 5, so that when in one position the bolt is held away from the flange 26, as shown in Figs. 3 and 5, and when the hand wheel 35 is turned a half revolution the bolt 33 is free to enter the adjacent opening 27. By this means the rotatable base may be permitted to freely rotate relative to the dial or it may be held in position so that it will only have a slight rotary movement relative to the dial limited by the length of the slot 31. When the arm 30 and the flange 26 are held together by the bolt 33, the rotary base may be accurately adjusted with relation to the dial by means of a screw 38 mounted in suitable bearings 39 at the side of the dial and seated in a block 40, which block is pivotally supported on bearings 41 carried by the arm 30. These bearings are slotted, as shown in Fig. 3, so that the block 40 may have a limited movement radially relative to the dial, and it is obvious that by a manipulation of the screw 38 the rotary base may be adjusted with great accuracy relative to the stationary dial.

Fixed in position at the center of the rotary base 25 is a circular frame 42 arranged perpendicularly to the base. This circular frame is intended, when in use, to be rotated relative to the base in the same manner that the earth rotates upon its axis, and I have therefore sought to give it the general appearance of a skeleton globe by securing to it at suitable intervals circular bars 43 placed on the circular frame in the same positions as the lines indicating latitude and longitude are placed upon a globe made to represent the earth. Beginning at the top of the circular frame the first circular bar represents the Arctic circle, the next the tropic of Cancer, next the equatorial line, next the tropic of Capricorn, and near the bottom, the Antarctic circle, and running from the top to the bottom of the circular frame are one or more circular bars representing the various meridian lines on a globe, in the present instance only one being shown indicated by the numeral 44.

Figures 10, 11, 12, 13, 14:
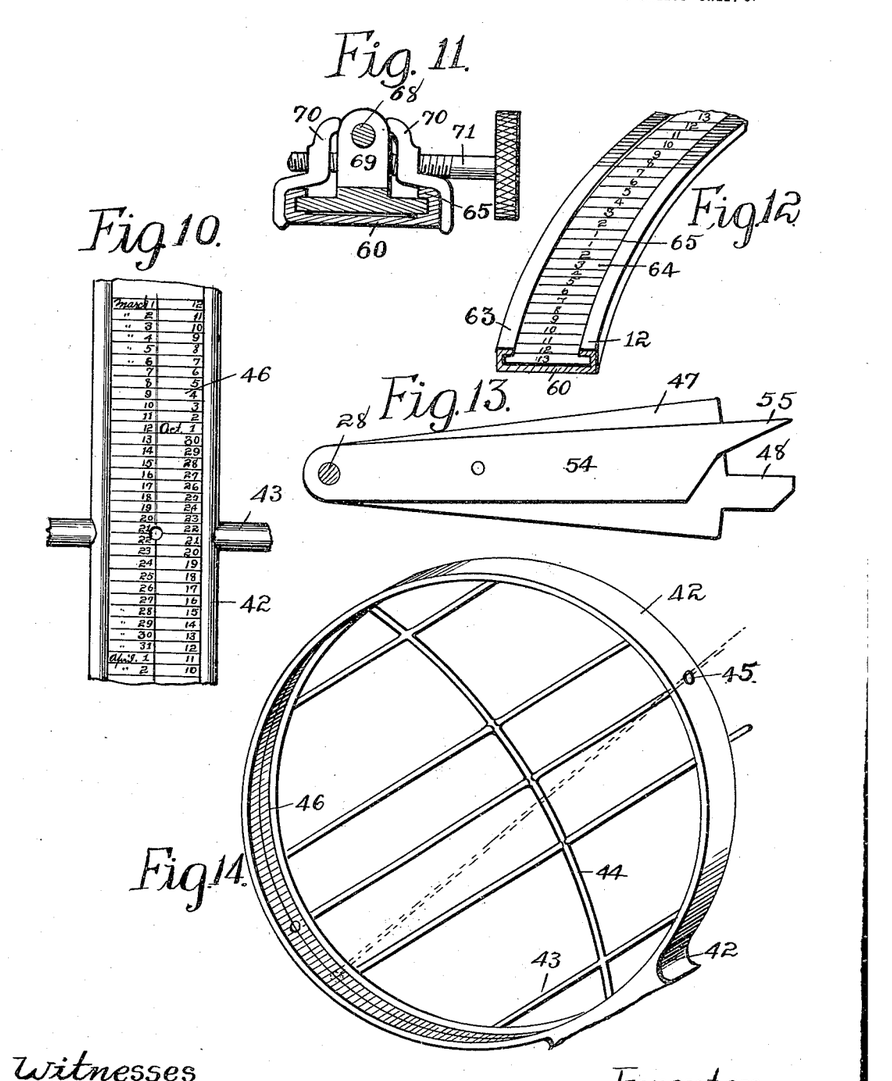
Fig. 10 shows an enlarged, detail view illustrating a portion of the sun declination plate for use in determining the days of the year.
Fig. 11 shows an enlarged, detail, sectional view illustrating a part of the means for adjusting the position of the telescope.
Fig. 12 shows a detail, perspective view illustrating the guide frame for supporting the telescope and also a portion of the telescope angle scale.
Fig. 13 shows a plan view of the sun and standard time indicators.
Fig. 14 shows a perspective view of the circular frame for determining the sun's declination. The dotted lines in said figure illustrate the manner in which a ray of sunlight passes through an opening in said frame and indicates the particular scale marked on the sun's declination scale, whereby the day of the year is determined.

At the equatorial line of the circular frame on one side is a small perforation 45 shown in Fig. 14, and other perforations at suitable points may be provided if desired. On the interior of the circular frame on the side opposite from the perforation 45 is a scale indicating the sun's declination and hereinafter referred to as the "sun's declination scale." This scale is preferably provided, as shown in Fig. 10, with scale marks 46 equally spaced apart and with suitable indicia indicating the days of the various months of a complete year. The operation of the instrument with relation to this sun's declination scale for determining the latitude will be fully described herein.

Figure 8:
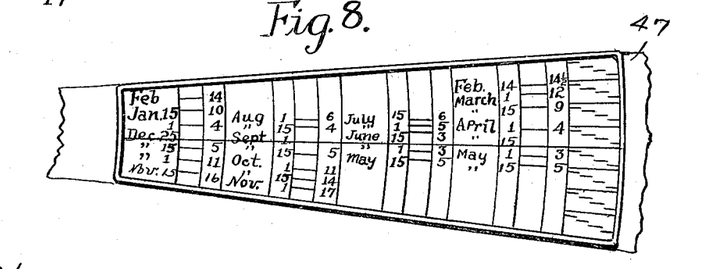
Fig. 8 shows a plan view of the time correcting scale.

It is well known that there is a considerable variation in regard to the relative positions of the sun and the earth at a given time each day throughout the year, the total variation amounting to approximately thirty minutes; that is to say, on some days the sun will be approximately fifteen minutes fast and on other days approximately fifteen minutes slow, or the variation will be at some point midway between these extremes. This variation is commonly termed "sun fast" or "sun slow." In order therefore to determine the time accurately on any given day, the exact amount of the "sun fast" or "sun slow" on that day must be taken into consideration. To provide for said variation, I mount upon the under surface of the rotary base an indicator arm 47 having an indicator straight edge 48 projecting outwardly from it to a point adjacent to the dial scale 24. This indicator arm, as shown in Fig. 13, is rotatably mounted upon the axle 28, and it is provided on its upper face with a scale hereinafter referred to as the "time correcting scale." This scale has marked upon it either all of the months and days of a year, or preferably only such certain dates upon which the "sun fast" or "sun slow" varies materially from the normal; for instance, the scale shown in Fig. 8 shows a sufficient number of dates for ordinary accuracy in connection with an instrument of this kind. This scale is preferably placed directly beneath an opening in the rotary base covered by glass 49, as shown in Fig. 7, and beneath this glass is a radially extended indicating mark 50 which may be a fine wire such as indicated at 50 in Fig. 7. To provide for adjusting this indicator arm relative to the rotatable base, I have provided an upwardly extending bolt 51 on the indicator arm 47 extended through a slot 52 in the rotary base and provided with a winged nut 53 at its upper end. If, for instance, the observation is being made on the first day of November, the operator adjusts the arm 47 to position where the indicator line, adjacent to the date November 1, on the time correcting scale, will be directly under the indicator line or mark 50 on the rotary base. This obviously will bring the straight edge 48 of the indicator to position where it will indicate upon the dial plate a position approximately fifteen minutes slower than if the straight edge 48 were arranged exactly in line with the indicating line 50, it having been previously determined that on November 1 the sun's variation made the "sun slow" approximately fifteen minutes late.

Arranged beneath the indicating arm 47 is a second indicating arm 54 to indicate standard time. This indicating arm 54 is pivoted to the axle 28 and has a pointer 55 adjacent to the dial scale.

In order to accurately fix the indicator arm 54 in position relative to the indicator arm 47, I have provided a bolt 56 fixed to the indicator arm 54 and extended through a slot 57 in the arm 47. A winged nut 58 is placed on said bolt and said winged nut projects through a slot 59 in the rotary base 25 so that the two arms 47 and 54 may be clamped together and when so clamped the arm 47 may also be adjusted relative to the rotary base.

In connection with the use of the indicator arm 54, the operator first sets the indicator arm 47 to indicate the proper sun time and he then fixes the indicator arm 47 to the rotary base. He then ascertains the correct standard time by means of a chronometer and sets the indicator arm 54 to indicate the correct standard time on the dial and when this is done the two arms 47 and 54 are clamped together by means of the winged nut 58, whereupon the difference in time between actual sun time and actual standard time may be ascertained at a glance upon the dial, the advantage of this feature of the apparatus being that the operator may ascertain the standard time without reference to printed tables.

For the purpose of using my improved instrument at night, for making the same deductions as may be made by the use of sunlight, I have provided a telescope attachment by which the operator may place the instrument in proper position relative to any star whose true declination and right ascension are known so that the same results may be attained as with the ray of sunlight projecting through the opening 45 in the circular frame. This attachment comprises a semi-circular frame 60 detachably connected by bolts 61 and nuts 62 with the circular frame. This semi-circular frame 60 is preferably provided with side edges extending first outwardly away from the frame, then inwardly toward the center of the frame, as shown at 63 in Fig. 12. A scale 64 is marked in this frame 60 consecutively from a neutral point indicated by the numeral 65 in Fig. 12, and extending in both directions from said neutral point. Slidingly mounted within the flanges of the frame 60 is a telescope supporting block 66 and a telescope 67 is firmly fixed to said block.

In order to provide for the accurate adjustment of the telescope relative to the frame 60, I have pivotally connected to the block 66 an adjusting screw 68 seated in a block 69, which block is slidingly mounted in the frame 60, as shown in Fig. 11. The said block 69 and its screw 68 are capable of free movement with the frame 66.

Figure 2:
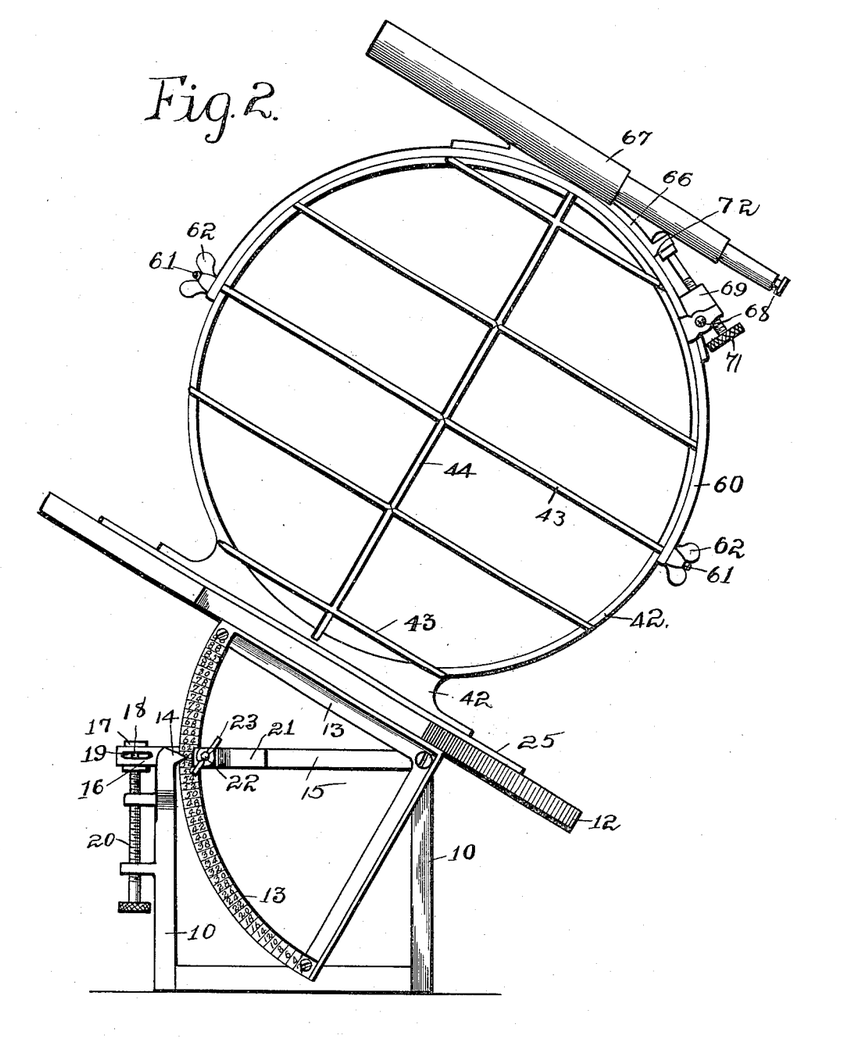
Fig. 2 shows a side elevation of a device embodying my invention disconnected from a pedestal and portable and provided with a telescope attachment.

In order to clamp the block 69 in any desired position with relation to the frame 60, I have provided two clamping jaws 70 to engage opposite sides of the block 69 and to overlap the sides of the frame 60. These clamping jaws are moved toward and from the block 69 by means of an adjusting screw 71 extended through the block 69 and seated in the clamping member 70. The said screw and the said clamping members are threaded in opposite directions so that when the screw is turned one way the clamping members will engage the block 69 and when turned the other way, they will be moved away from the block 69. In practice with this part of the device, and assuming that the clamping members 70 are disengaged from the block 69, the telescope and its frame 66 may be freely moved throughout the limits of the frame 60. If accurate adjustment of the telescope is desired the clamping jaws 70 are secured to the block 69, whereupon, by a manipulation of the screw 68 the telescope and its frame 66 may be accurately adjusted to any desired position within the limits of movement of the screw 68. The scale 64 is so arranged that it may be read with relation to the rear end of the frame 66 as indicated by the numeral 72 in Fig. 2.

Figure 1:
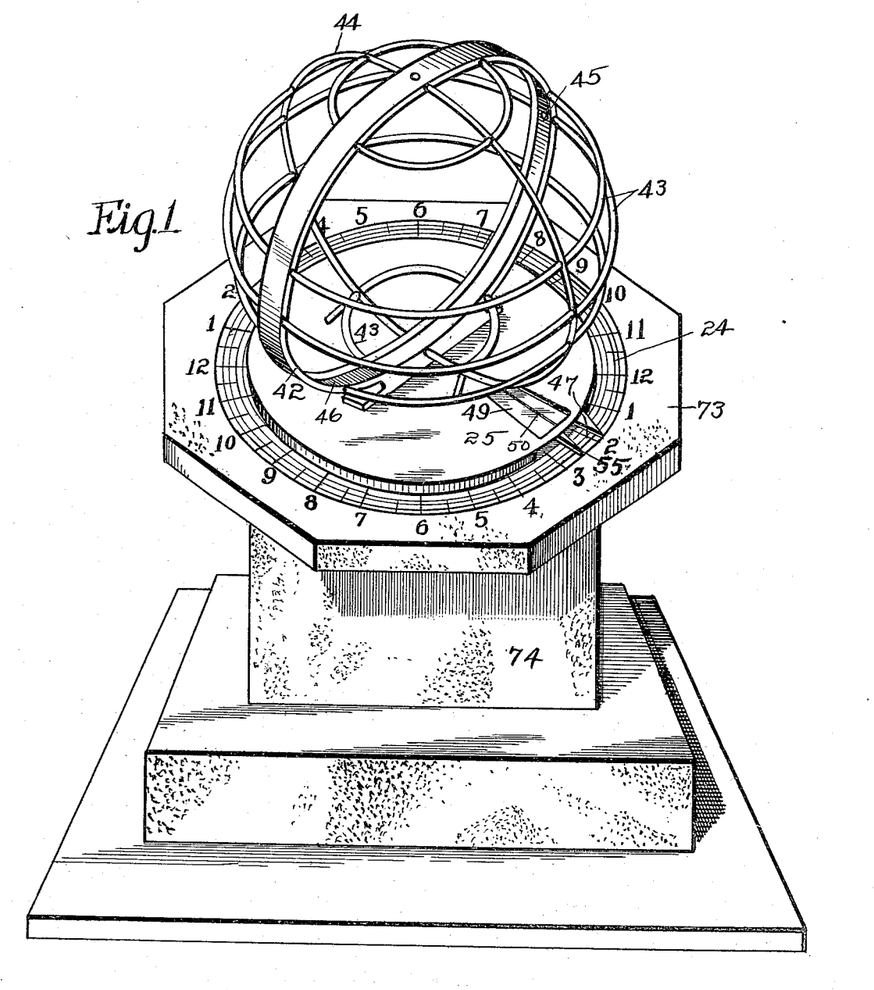
Figure 1 shows a perspective view of a device embodying my invention permanently located on a suitable pedestal.

In the modified form of the invention, shown in Fig. 1, I have illustrated a form of my device intended only as a sun dial for the purpose of ascertaining the day of the year and the time of the day and in place of the tilting dial frame, I have provided a stationary dial frame 73 permanently fixed to a suitable stationary pedestal 74.

On the drawings I have arranged the scale so that the numerals 6—6 lie in a reading line across the dial, although this arrangement is not essential in the operation of the machine. The scale could be arranged so that the numerals 12—12 would lie in a reading line in place of the arrangement as indicated on the drawings. If the scale was arranged with the numerals 12—12 on the reading line, the indicator 47 would have to be arranged at a point immediately beneath the circular frame 42 to give the proper reading. I prefer the arrangement as indicated in drawings, as the scale may be more easily read.

In practical operation with my improved instrument, and assuming that it is desired to ascertain the latitude of the place at which the observation is taken, I proceed as follows: I first place the base of the instrument on a suitable support and support it in horizontal position which may be done by the use of the levels attached thereto. Assuming that the observation is made from a point north of the equator, I then place the dial in position where a line drawn through the numerals 6 thereon will be due north and south and with the edge of the dial that moves upwardly from the base pointing toward the south. This may be done by the use of an ordinary compass. I then tilt the dial until a ray of sunlight passing through the opening 45, as shown in Fig. 14, strikes upon the scale indicating the sun's declination on the interior of the circular frame on the side opposite from the side containing the opening 45. The dial is tilted until the ray of sunlight strikes upon that portion of the sun's declination scale containing the date on which the observation is being made. The dial is then fixed in position at said angle and the operator may, by reading the dial angle scale 13, determine the latitude by reference to the indicating point 14 with relation to said scale 13. This operation may be made at any time during the day.

In order to determine the longitude of the locality in which the observation is being made and assuming that the instrument has been set, as before described, and that the latitude has been determined, I then find the exact sun time of said locality as follows: I first adjust the time correcting scale, shown in Fig. 8, so that the day on which the observation is being made, or the day nearest thereto that is indicated upon said scale, will stand directly beneath the indicating mark 50 on the rotary base; then when the ray of sunlight passing through the perforation 45 is exactly centered on the central line marked on the interior of the circular frame, as shown in Figs. 10 and 14, the straight edge 48 of the sun time indicator will point to the exact sun time of the locality on the dial. After the sun time has thus been accurately determined, I ascertain the exact standard time by reference to a chronometer having Greenwich time and if, for instance, the standard time is six hours and sixteen minutes faster than the sun time as indicated on the dial, then the longitude may be determined as follows: It is well known that one degree of longitude is the equivalent to four minutes of time; therefore it is obvious that if the standard Greenwich time is six hours and sixteen minutes faster than the sun time, as indicated on the dial, the longitude of the locality will be ninety-four degrees west of the meridian of Greenwich.

Assuming that the instrument is placed at the proper angle for the latitude at which the observation is being made and that it stands due north and south, as before described, then obviously the correct sun time may be readily and quickly ascertained by simply turning the circular frame to position where the ray of sun light will be exactly centered on the central line on the interior of the opposite side of the circular frame, whereupon the sun time indicator will point to the proper time on the stationary dial. If it is desired to give the correct standard time in connection with the standard time for the locality in which the observation is being made in connection with the exact sun time, I then determine the exact sun time in the manner before described and the exact standard time for the locality and set the standard time indicator in its proper position either fast or slow with relation to the sun time indicator, then at any time that an observation is being made the operator may determine both the sun time and the standard time for the locality.

All of the foregoing observations may be made with my improved instrument at night by the use of a telescope attachment to be substituted for the ray of sunlight, it being necessary however that the operator know the true declination and right ascension of the star to be viewed through the telescope and with relation to which the observation is being made. In operating my device in connection with a telescope, I adjust the telescope with reference to the scale 64 by setting off from the neutral point as many degrees, minutes and seconds as the declination of the star to be observed is shown to have, plus or minus as the case may be; then I secure the telescope in place by the adjusting screw 71 so that it becomes rigid with the circular frame 42. I then place the dial in position so that a line drawn through the numerals 6 thereon will be due north and south, which may be determined by the pole star when visible. I then level the base 10 and rotate the circular frame 42 and tilt the dial plate 12 until the said star is brought into the center of the telescope field, when the said dial plate will be in a plane parallel to that of the planes of the terrestrial and celestial equators, and the latitude of the place of observation will be indicated on the dial angle scale 13 by the indicator 14, it being understood that when the telescope is adjusted to the neutral point of the scale 64, it is then parallel to the equatorial line and also to the plane of the dial plate 12; and further that, whenever the instrument is properly adjusted for observation, either by the sun's light or by means of the telescope, the plane of the dial plate 12 must be in a plane parallel to that of the plane of the equator of the earth and the base 10 being level, the latitude of the place will be correctly indicated on the scale 13, and the longitude of the star in relation to the longitude of the place of observation will be indicated, in time, by the sun time indicator on the dial plate 12 and from this data and a chronometer giving Greenwich time, and tables giving the declination and right ascension of the stars hereinbefore mentioned, the longitude of the place may be determined by a mathematical calculation familiar to those skilled in the art. It is to be understood in this connection that the scale illustrated in Fig. 10 is originally prepared, from tables familiar to those skilled in the art, which show the sun's declination for the various days of a year. It is to be understood also that in preparing the scale marks and applying the dates thereto, the operator must also take into consideration the fact that the ray of sun light that passes through the small perforations in one side crosses the center of the circular frame and is visible upon the scale on the opposite side of the frame, so that if the sun is above the equatorial line, the ray of light will fall upon the scale below the equatorial line of the circular frame, and vice versa.

When the instrument is used only as a local sun dial and the days of the year are placed on the scale 46, approximation only can be obtained because of slight variation of the sun's declination by reason of leap-years, etc. It is to be understood in this connection that the operator making observations from stars will have access to a suitable table giving the true declination and right ascension of such stars as may be used conveniently for this purpose.

In connection with the modified form of the invention, shown in Fig. 1, and assuming that the exact latitude and longitude of the location are known, then the dial is permanently fixed at the correct angle for the location and any operator may determine the day of the year and both the sun and standard time by simply moving the circular frame to position where the ray of sunlight will strike upon the central line of the frame on the side opposite from the opening and upon the sun's declination scale which gives the days of the year. The ray of light will point to the day of the year and the respective sun and standard indicators will point to the respective markings on the dial plate indicating the correct sun and standard times.

I claim as my invention:

1. In an instrument of the class described, the combination of a horizontal base, a dial on the base capable of tilting movement relative thereto, means carried by the dial for enabling an operator to place the dial in a plane parallel with the plane of the earth's equator by an observation of a heavenly body through or by said means, a scale and an indicator operatively connected to said tilting dial and to said base, to coact with each other to indicate the latitude of the place where the observation is being made when the dial has been tilted to a plane parallel with the plane of the earth's equator.

2. In an instrument of the class described, the combination of a horizontal base, a dial on the base capable of tilting movement relative thereto, means carried by the dial for enabling an operator to place the dial in a plane parallel with the plane of the earth's equator by an observation of a heavenly body through or by said means, a scale and an indicator operatively connected to said tilting dial and to said base to coact with each other to indicate the latitude of the place where the observation is being made when the dial has been tilted to a plane parallel with the plane of the earth's equator, and means for locking said dial in a tilted position.

3. In an instrument of the class described, the combination of a base capable of being supported in a horizontal position, a dial on the base capable of tilting movements relative to the base, a frame rotatably mounted on the dial, said frame including means for enabling an operator to place the dial in a plane parallel with the plane of the earth's equator by an observation of a heavenly body through or by said frame, a scale carried by the tilting dial, and an indicator on the base to coact with the scale.

4. In an instrument of the class described, the combination of a tilting dial, a circular frame pivotally supported on the tilting dial having means carried by one side of the circular frame for designating on the other side of the frame when the frame is placed in exact alinement with the sun, and a sun's declination scale marked upon said other side of the circular frame.

5. In an instrument of the class described, the combination of a tilting dial, a circular frame pivotally supported on the tilting dial having means carried by one side of the circular frame for designating on the other side of the frame when the frame is placed in exact alinement with the sun, a sun's declination scale marked upon said other side of the circular frame, and an indicator carried by the rotary frame to coact with said dial.

6. In an instrument of the class described, the combination of a tilting dial, a rotary base mounted thereon, an indicator carried by the base to coact with the dial, a circular frame fixed to the rotary base at right angles thereto, said frame being provided with a perforation on one side, and a sun's declination scale on the other side of said frame, for the purposes stated.

7. In an instrument of the class described, the combination of a tilting dial, a rotary base thereon, a frame fixed to the base having means whereby the operator may ascertain when the frame is in line with a heavenly body, an indicator movable concentric with said rotary base, and designed to coact with the dial, said indicator being provided with marks indicating the amount of "sun fast" or "sun slow" for certain days, and an indicating mark carried by the rotary base to coact with said scale on the indicator.

8. In an instrument of the class described, the combination of a dial, a frame rotatable relative to the dial having means for ascertaining when it is in line with the sun, an indicator arm movably connected to the rotary frame and designed to coact with the dial, a scale marked upon said indicator arm for determining the amount of "sun fast" or "sun slow" for certain days, and an indicator mark to coact with said scale.

9. In an instrument of the class described, the combination of a dial a frame rotatable relative to the dial having means for ascertaining when it is in line with the sun, an indicator arm movably connected to the rotary frame and designed to coact with the dial, a scale marked upon said indicator arm for determining the amount of "sun fast" or "sun slow" for certain days, an indicator mark to coact with said scale, and a standard time indicator arm adjustably connected with the aforesaid indicator arm and designed to coact with said dial.

10. In an instrument of the class described, the combination of a suitable base designed to be supported in a horizontal position, an indicator carried by the base, a tilting dial, a quadrant carried by the tilting dial coacting with said indicator and having an angular scale marked thereon, a rotary base carried by the dial, a circular frame fixed to the base at right angles thereto, said circular frame being provided on one side with a perforation and on the interior of its other side with a sun's declination scale, an indicator arm carried by the rotary base and designed to coact with the dial, said indicator arm having a scale thereon indicating the amount of "sun fast" or "sun slow" for certain days, an indicator carried by the rotary base for said scale, and a standard time indicator arm adjustably supported relative to the aforesaid indicator arm, for the purposes stated.

11. In an instrument of the class described, the combination of a base designed to be supported in a horizontal position, a tilting dial, an angular scale carried by the tilting dial, an indicator for the said scale, a circular frame rotatably mounted at right angles to the dial, a telescope supported for circumferential movement on the circular frame, and a scale on said circular frame to coact with the telescope, said scale on the circular frame being marked with such relation to the first mentioned scale as to enable the operator to adjust the dial to the proper angle by reference to the scale carried by the circular frame.

Des Moines, Iowa, April 1, 1911.

CHARLES L. EARLY.

Witnesses:
R. L. McCord, Jr.,
C. C. Jameson.